US009165287B2

(12) United States Patent
Habib et al.

(10) Patent No.: US 9,165,287 B2
(45) Date of Patent: Oct. 20, 2015

(54) APPARATUS AND METHOD FOR AUGMENTING DIGITAL EDUCATIONAL CONTENT WITH SOCIAL LEARNING TOOLS

(75) Inventors: Babur Habib, San Francisco, CA (US);
Osman Rashid, Fremont, CA (US);
David M. Straus, Los Altos, CA (US);
Ousama Haffar, San Jose, CA (US);
Bradley S. Hochberg, San Jose, CA (US); Chris Lochhead, Truckee, CA (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 13/417,141

(22) Filed: Mar. 9, 2012

(65) Prior Publication Data

US 2012/0254308 A1 Oct. 4, 2012

Related U.S. Application Data

(60) Provisional application No. 61/452,057, filed on Mar. 11, 2011.

(51) Int. Cl.
*G06F 15/16* (2006.01)
*G06Q 10/10* (2012.01)
*G06Q 50/00* (2012.01)
*G09B 5/08* (2006.01)

(52) U.S. Cl.
CPC ............... *G06Q 10/10* (2013.01); *G06Q 50/01* (2013.01); *G09B 5/08* (2013.01)

(58) Field of Classification Search
USPC ......................................... 709/204, 206, 217
See application file for complete search history.

(56) References Cited

U.S. PATENT DOCUMENTS

| | | | |
|---|---|---|---|
| 2009/0164904 A1* | 6/2009 | Horowitz et al. | 715/723 |
| 2009/0254499 A1* | 10/2009 | Deyo | 706/12 |
| 2009/0325142 A1* | 12/2009 | Beavers et al. | 434/365 |
| 2012/0143590 A1* | 6/2012 | Ajima | 704/2 |
| 2012/0215798 A1* | 8/2012 | Burris et al. | 707/755 |

\* cited by examiner

*Primary Examiner* — El Hadji Sall
(74) *Attorney, Agent, or Firm* — Schwabe, Williamson & Wyatt, P.C.

(57) ABSTRACT

A non-transitory computer readable storage medium includes executable instructions to display electronic content, associate a subset of the electronic content with a comment from a user and submit the subset of the electronic content and the comment to a forum accessible by a plurality of users.

17 Claims, 2 Drawing Sheets

APPARATUS AND METHOD FOR AUGMENTING DIGITAL EDUCATIONAL CONTENT WITH SOCIAL LEARNING TOOLS

CROSS-REFERENCE TO RELATED APPLICATION

This application claims priority to U.S. Provisional Patent Application Ser. No. 61/452,057, filed Mar. 11, 2011, entitled "Integrating Social Learning with digital educational Content", the contents of which are incorporated herein by reference.

FIELD OF THE INVENTION

The present invention relates to information exchange in networked environments. More particularly, the invention relates to augmenting digital educational content with social learning tools.

BACKGROUND OF THE INVENTION

There has been a growing increase in the use of electronic devices to assist in the learning process. In some cases, traditional classroom learning has been completely replaced by online classes where there is no face-to-face interaction at all. Even in cases where classroom learning is utilized, additional electronic devices and media are typically used to supplement traditional classroom learning.

In both the educational arena and other areas where electronic content is consumed, it is useful to have ways to increase the social bonds and sharing between users of the electronic content. Some mechanisms are available to facilitate interaction, such as systems that allow users to subscribe to class lists to receive distributed class material and systems that allow users to share content. However, there is still a need for more targeted interactions based on electronic content. For example, although a class thread or discussion forum is useful, there is still a level of separation from the referenced electronic content. Consequently, there is a need for a more integrated approach to social learning.

SUMMARY OF THE INVENTION

A non-transitory computer readable storage medium includes executable instructions to display electronic content, associate a subset of the electronic content with a comment from a user and submit the subset of the electronic content and the comment to a forum accessible by a plurality of users.

A social learning system includes an electronic device communicative with a plurality of users in a community, wherein the electronic device displays an electronic document and wherein the plurality of users in the community share a subset of the electronic document that is annotated with a comment from a user in the community.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

A method and apparatus for improved social learning are disclosed. Users of electronic devices that are connected through a network can create and associate digital content such as comments to particular locations in an electronic document. Individual users can view the digital content associated with a particular location in an electronic document and filter the digital content based on characteristics of the digital content or on characteristics of the user who created and associated the digital content with a particular location in the electronic document. Likewise, a third party such as a book editor or an instructor can filter the digital content based on characteristics of the digital content or on characteristics of the user who created and associated the digital content with a particular location in the electronic document.

The invention may be utilized in connection with numerous types of electronic readers, including electronic readers for textbooks. Although this invention is not limited to the consumption of such educational materials, an embodiment of the invention is disclosed in connection with such educational materials for the purpose of illustration.

Although it is common to have discussion threads or electronic reviews online associated with a particular book, it would be useful to have targeted comments from other users relating to specific portions, pages or lines in the book. For example, if a particular equation or paragraph in a book is confusing, other user comments relating to that particular item would be useful to have when reading that item. Likewise, a user can comment on that particular portion and broadcast it to an online forum so that other users, in turn, can benefit from that comment. In addition, different filtering techniques can be used to control the content or order of appearance of the content added to or associated with a particular location in the electronic book. The filtering or sorting can be done based on characteristic information such as information related to the content or information related to the poster of the comment.

In one embodiment of the invention, there is a link within an electronic reader to an online forum. The online forum can be, among others, one that is controlled by the distributer of the electronic device, one controlled by the distributer of the electronic content, or an external forum (such as Facebook® or Twitter®).

Figure 1:
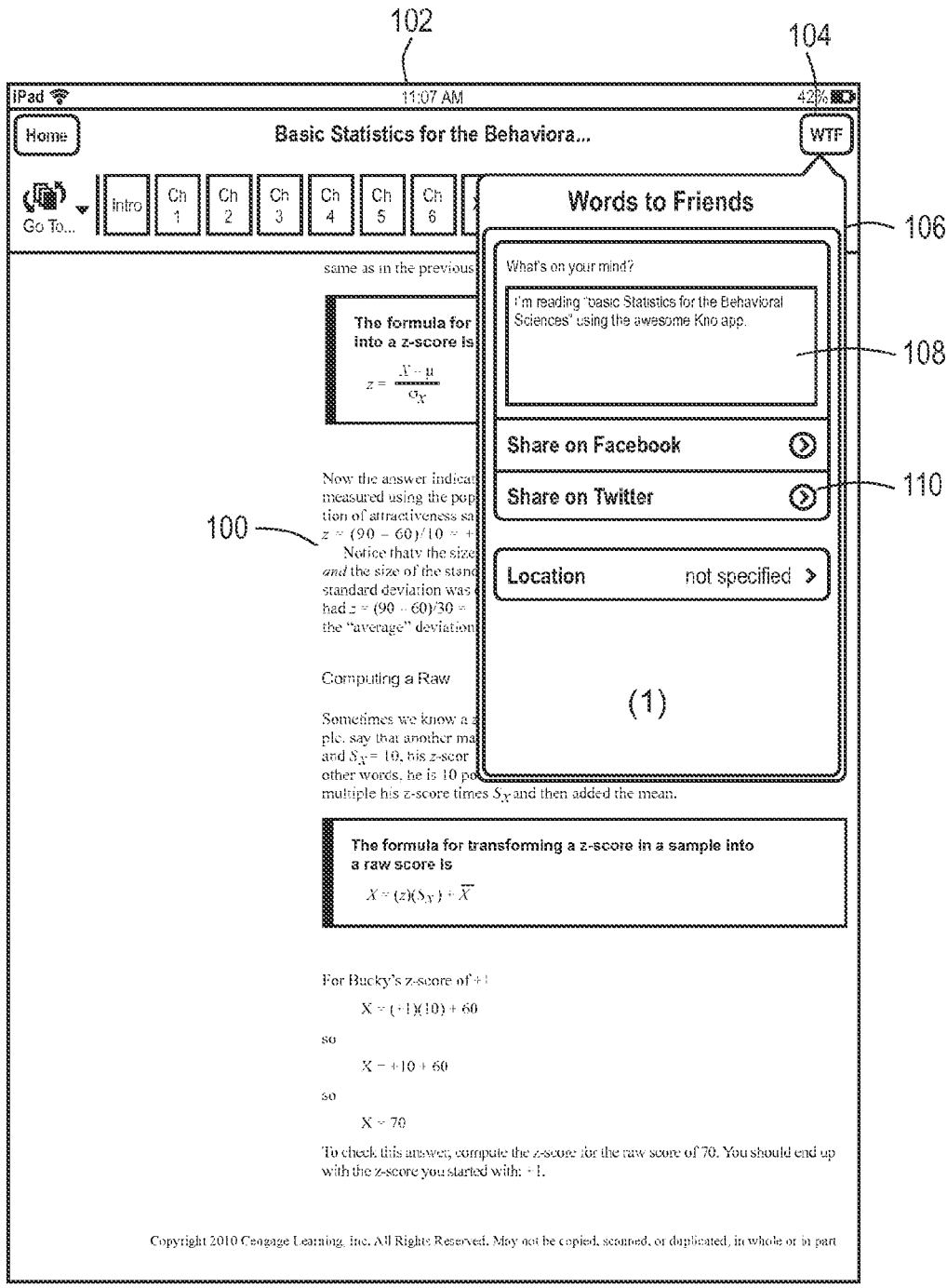
FIG. 1 is a view of an electronic document with social learning tools associated with particular portions of an electronic document.

FIG. 1 illustrates educational content 100 associated with a textbook. The textbook has navigation controls in a navigation bar 102. An icon 104 is provided to share content. Invocation of the icon 104 results in the display of a graphical user interface 106. The interface 106 includes a comments section 108. The comments section 108 is linked with the displayed educational content 100, which is a subset of the textbook.

The user is able to exercise control over what comments are posted to comments section 108. This control can be based on information related to the particular electronic content being commented on or information related to the poster of the comment. For example, information related to the electronic content being commented on could be the textbook name, a topic associated with that textbook, a class associated with that textbook, a page number of the textbook, etc. The information related to the poster of the comment could be their name, school name, class name, picture, location, group name, etc.

While there are many variations, in general, whatever information is available about the content associated with the comment as well as about the poster can be used to filter which comments appear. This information is called characteristic information.

In addition to filtering the comments, the comments can be sorted or searched based on a piece of characteristic information. For example, if the filter used is the name of the poster, a user can choose to display only comments from a particular poster or not display any comments from a particular poster. Likewise, the filter can be used to only display comments that are associated with the particular page of the electronic content that is being utilized. The filter could also be based, for example, on the textbook containing that page, the topic associated with the page or textbook, or the class to which the textbook is associated. Another filter could be based on the time the comment was posted or broadcasted.

Many variations of this concept can be utilized since there are many possibilities of what information is associated with a particular location within an electronic content, and with what information is associated with a particular user. Utilizing this information to display targeted comments on specific portions of electronic content enhances the experience of consuming electronic content.

The power to customize the displayed comments expands with increasingly better organization of electronic content. For example, in the educational context, users can associate textbooks, notebooks, assignments and other electronic content with their individual classes within a particular university. The textbooks and other electronic content can have pre-assigned or user assigned associated topics. User groups can be manually created or created from all people associated with a particular university or with a particular class. These groups can then be used to filter or sort displayed comments as well as to limit who sees that particular user's comments.

In terms of the data associated with a particular student, the user could control which types of information that can be utilized when they broadcast or post comments. So, for example, a user can not only choose to see or block comments from a particular user but can also control which users are able to see his or her comments. Likewise, the user can control which information from his or her own profile and location are shared. This may be done in conjunction with the comment and therefore can be used by other users for sorting displayed comments.

This ability to consume electronic content with target comments from an online forum greatly enhances the experience. Users can share thoughts and comments in a targeted, useful and efficient manner. This information can then be collected and transformed in various ways to increase the productivity of the student and/or be used to inform the educator and the publishers. Although the embodiment described is related to an electronic reader, the link to the online forum could be also utilized in different areas. For example, the link could exist in a navigation page or other page where a logical filter would be a particular topic or class.

Figure 2:
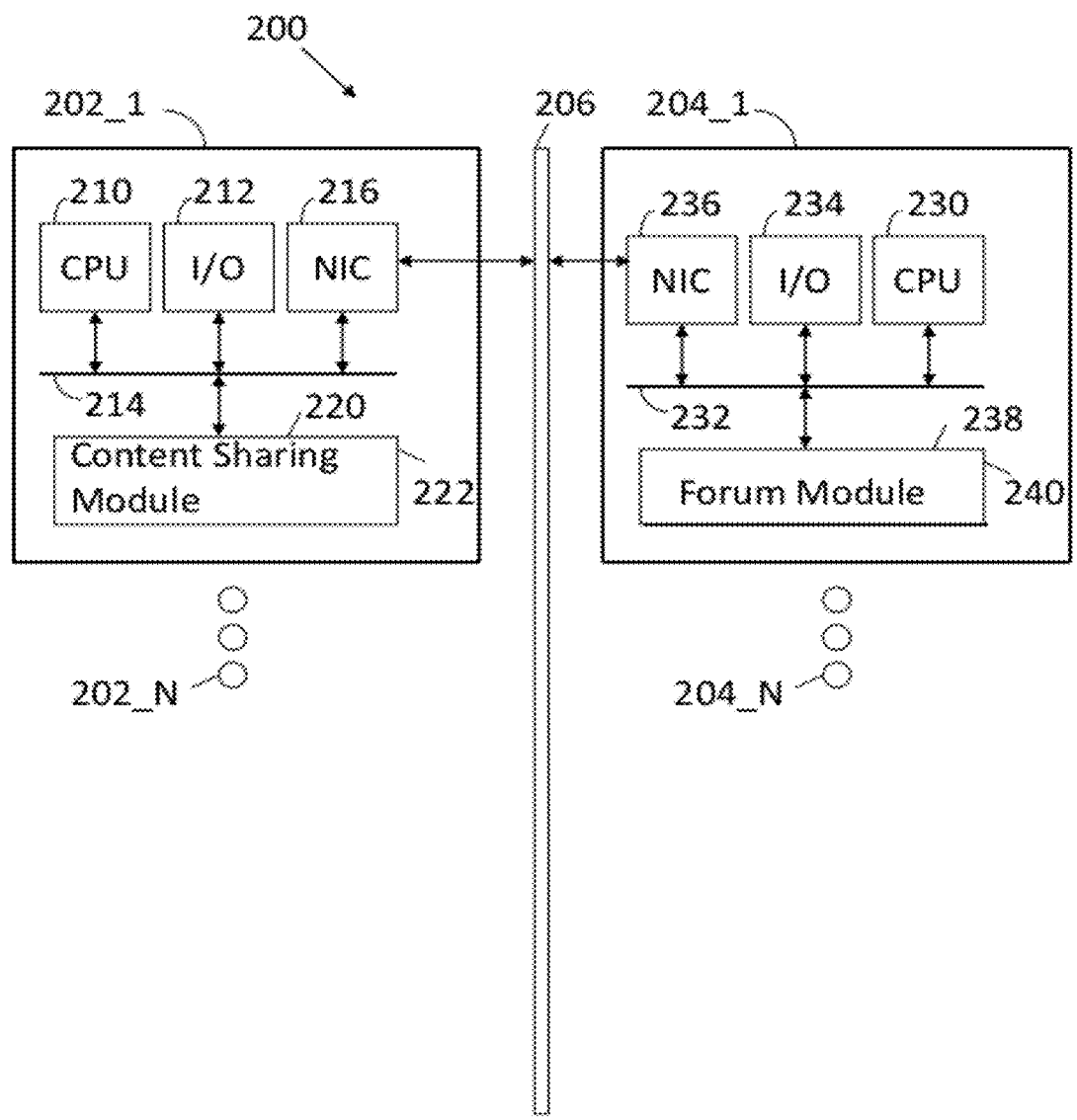
FIG. 2 illustrates a system configured in accordance with an embodiment of the invention.

FIG. 2 illustrates a system 200 configured in accordance with an embodiment of the invention. The system 202 includes a set of client devices 202_1 through 202_N and a set of servers 204_1 through 204_N linked by a network 206, which may be any wired or wireless network. The client device 202 may be an electronic reader, a tablet, a mobile telephone, a computer or any other electronic device operative in a networked environment. Each client device 202 includes standard components, such as a central processing unit 210 and input/output devices 212 linked by a bus 214. The input/output devices 212 may include a keyboard, mouse, touch display and the like. A network interface card 216 is also connected to the bus 214. The network interface card 216 provides connectivity to network 206. A memory 220 is also connected to the bus 214. The memory 220 stores a content sharing module 222. The content sharing module 222 includes executable instructions to implement operations of the invention. In particular, the content sharing module 222 includes executable instructions to display electronic content, associate a subset of the electronic content with a comment from a user and to share the electronic content and comment to a forum.

Each server 204 includes standard components, such as a central processing unit 230 and input/output devices 234 linked by a bus 232. A network interface circuit 236 and memory 238 are also connected to bus 232. The memory 238 stores a forum module 240, which includes executable instructions to host a forum in which client devices have access to posted electronic content and associated comments. The forum module 240 may operate as a host, in which case clients 202 access the posted electronic content and associated comments. Alternately, the forum module 240 may operate on a push model where posted electronic content and associated comments are pushed to clients 202 as messages. The forum module 240 may also include executable instructions to implement the disclosed filtering operations. Alternately, or in combination, the content sharing module 222 may perform filtering operations.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions which, in response to execution by a client computing device, cause the client computing device to:
   display electronic content to a user of the client computing device;
   enable the user of the client computing device to define characteristic information such that the user controls an association between a subset of the displayed electronic content and a comment entered by the user; and
   submit the comment, along with the characteristic information associated with the comment, to a server accessible by a plurality of other users to enable individual users of the plurality of other users to view the comment when viewing the associated subset of electronic content on individual client computing devices respectively associated with the individual users, wherein the characteristic information enables the plurality of other users to apply a filter or sort to the comment.

2. The non-transitory computer readable storage medium of claim 1, wherein the executable instructions, when executed by the client computing device, further cause the client computing device to:
   receive one or more comments along with characteristic information associated with each comment from the server, wherein the one or more comments are received from the server when the characteristic information associated with the one or more comments indicates that the user is permitted to view the one or more comments, the one or more comments and the associated characteristic information being submitted to the server by one or more of the plurality of other users and associated with the electronic content displayed to the user;
   apply a filter or sort to the one or more comments based on desired characteristic information; and
   annotate the electronic content displayed to the user with the one or more comments based on the applied filter or sort.

3. The non-transitory computer readable storage medium of claim 1, wherein the executable instructions, in response to execution by the client computing device, further cause the computing device to:
   accept, from the user of the computing device, input designating a subgroup of the plurality of other users with which to share the submitted comment; and
   submit the designation to a forum to facilitate the sharing of the comment with only the designated subgroup.

4. The non-transitory computer readable storage medium of claim 3, wherein to define the characteristic information includes a selection of content contained within received comments on the electronic content or information related to respective users that submitted the received comments, wherein the content contained within the received comments includes at least one of a name of the electronic content, a topic associated with the electronic content, and a portion of the electronic content, and wherein the information related to the respective users includes at least one of identification information associated with each of the respective users, a group to which each of the respective users belong, content associated with the group to which each of the respective users belong, and a location of each of the respective users.

5. A client computing device comprising:
   a processor;
   a network interface card coupled with the processor; and
   a content sharing module to be operated on the processor to:
   display electronic content to a user of the computing device;
   receive one or more comments along with respective characteristic information for each of the one or more comments from a server via the network interface card wherein the one or more comments are received from the server when the characteristic information associated with the one or more comments indicates that the user is permitted to view the one or more comments, the server accessible by the user and a plurality of other users, the one or more comments submitted to the server by one or more of the plurality of other users and associated, by the one or more of the plurality of other users, with respective subsets of the electronic content displayed to the user, the characteristic information defining the association between the one or more comments and the respective subsets of the electronic content;
   apply a filter or sort to the one or more comments based on desired characteristic information; and
   annotate the respective subsets of the electronic content displayed to the user with the one or more comments based on the applied filter or sort.

6. The computing device of claim 5 wherein the content sharing module is further to be operated on the processor to:
   accept input from the user of the computing device defining a new comment associated with a subset of the electronic content displayed to the user; and
   submit the new comment to the server along with characteristic information associated with the new comment to be aggregated with one or more other comments respectively associated with characteristic information to enable the plurality of other users to apply a filter or sort to the new comment and the one or more other comments based on the characteristic information associated with the new comment and the one or more other comments when viewing the electronic content.

7. The computing device of claim 5 wherein a definition of the characteristic information includes a selection of content contained within the associated comment or information associated with the respective user that submitted the comment, wherein the content contained within the associated comment includes at least one of a name of the electronic content, a topic associated with the electronic content, and a portion of the electronic content, and wherein the information related to the respective user includes at least one of identification information associated with the respective user, a group to which the respective user belongs, content associated with the group to which the respective user belongs, and a location of the respective user.

8. The non-transitory computer readable storage medium of claim 1, wherein the electronic content is an electronic book.

9. The non-transitory computer readable storage medium of claim 8, wherein the subset of the displayed electronic content is selected from a group consisting of a page, a paragraph, a line, or an equation contained within the electronic book.

10. The computing device of claim 2, wherein the characteristic information is information associated with individual users of the plurality of other users that submitted the one or more comments, specified criteria related to one or more of a name, school name, class name, or location of the individual users.

11. The computing device of claim 5, wherein the content sharing module is further to be operated on the processor to:

accept, from the user of the computing device, input designating a subgroup of the plurality of other users with which to share the submitted comment; and submit the designation to a forum to facilitate the sharing of the comment with only the designated subgroup.

12. The computing device of claim 5, wherein each of the one or more comments is associated with a portion of the electronic content displayed to the user and to annotate the electronic content displayed to the user with the one or more comments is to annotate the respective portions of the electronic content displayed to the user.

13. The computing device of claim 12, wherein the respective portions are selected from a group consisting of a page, a paragraph, a line, or an equation contained within the electronic content displayed to the user.

14. A server comprising:
a processor;
a network interface card coupled with the processor; and
a forum module to be operated on the processor to:
receive a plurality of comments along with characteristic information associated with each of the plurality of comments from a plurality of users via the network interface card, the plurality of comments associated, by individual users of the plurality of users, with respective portions of electronic content posted to a forum hosted by the forum module, the characteristic information being defined by the individual users of the plurality of users, and the characteristic information defining the association between each of the plurality of comments and the respective portions of the electronic content; and
provide access to the plurality of comments and the associated characteristic information to the plurality of users to enable the plurality of users to filter or sort the plurality of comments based on the characteristic information and view the electronic content with the respective portions annotated with the plurality of comments based on the filter or sort.

15. The server of claim 14, wherein the definition of the characteristic information includes a selection of content contained within respective individual comments of the plurality of comments or information associated with respective ones of the plurality of users that submitted the plurality of comments, wherein the content contained within the received individual comments includes at least one of a name of the electronic content, a topic associated with the electronic content, and a portion of the electronic content, and wherein the information related to the respective ones of the plurality of users includes at least one of identification information associated with each of the respective ones of the plurality of users, a group to which each of the respective ones of the plurality of users belong, content associated with the group to which each of the respective ones of the plurality of users belong, and a location of each of the respective ones of the plurality of users.

16. The server of claim 14, wherein to provide access to the plurality of comments to one or more of the plurality of users is to provide access to the plurality of comments to client computing devices associated with the one or more of the plurality of users.

17. The server of claim 16, wherein to provide access to the plurality of comments to the client computing devices is to push the plurality of comments to the client computing devices associated with the one or more of the plurality of users.

* * * * *